United States Patent
Jin et al.

(10) Patent No.: US 8,325,638 B2
(45) Date of Patent: Dec. 4, 2012

(54) PERFORMING PACKET FLOW OPTIMIZATION WITH POLICY AND CHARGING CONTROL

(75) Inventors: Haipeng Jin, Carlsbad, CA (US); Arungundram C. Mahendran, San Diego, CA (US); Kalle Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 12/631,534

(22) Filed: Dec. 4, 2009

(65) Prior Publication Data

US 2010/0142373 A1    Jun. 10, 2010

Related U.S. Application Data

(60) Provisional application No. 61/121,158, filed on Dec. 9, 2008, provisional application No. 61/121,344, filed on Dec. 10, 2008.

(51) Int. Cl.
*H04B 7/00* (2006.01)
(52) U.S. Cl. ........................................................ 370/310
(58) Field of Classification Search .................. 370/310, 370/328, 329, 400, 401, 431, 437; 709/227–229, 709/249
See application file for complete search history.

(56) References Cited

U.S. PATENT DOCUMENTS

| | | | | |
|---|---|---|---|---|
| 8,000,244 B1 * | 8/2011 | Canion et al. | ............... | 370/235 |
| 8,086,216 B2 * | 12/2011 | Feder et al. | ............... | 455/405 |
| 2006/0072595 A1 * | 4/2006 | Broberg et al. | ............... | 370/410 |
| 2009/0055543 A1 * | 2/2009 | Rasanen | ............... | 709/228 |
| 2009/0182883 A1 | 7/2009 | Giaretta et al. | | |
| 2009/0199268 A1 | 8/2009 | Ahmavaara et al. | | |

FOREIGN PATENT DOCUMENTS

| | | |
|---|---|---|
| EP | 2146458 | 1/2010 |
| WO | WO2008128470 | 10/2008 |

OTHER PUBLICATIONS

3GPP TS 23.203 V8.3.1: "3rd Generation Partnership Project; Technical Specification Group Services and System Aspects; Policy and charging control architecture (Release 8)," (Sep. 24, 2008), pp. 1-105, XP002574946, sections 5-6 Annex A-H.
International Search Report & Written Opinion—PCT/US2009/067204, International Search Authority—European Patent Office—Apr. 19, 2010.

* cited by examiner

*Primary Examiner* — Dmitry H Levitan
(74) *Attorney, Agent, or Firm* — Steven A. Raney

(57) ABSTRACT

Policy and charging control (PCC) is a framework within a Third or Fourth Generation (3G/4G) network that allows operators to authorize and enforce policy, Quality of Service (QoS), and charging control over communication sessions by mobile devices. PCC mechanism is used to determine the type QoS based on a request received from a User Equipment (UE) or network. PCC is one important element within System Architecture Evolution (SAE) architecture to allow the network to perform policy and charging control. A mechanism is provided so that PCC can allow packet flow optimization. Thereby, the network can detect Internet Protocol (IP) flows based on operator defined criteria and can perform policy and QoS control.

32 Claims, 9 Drawing Sheets

PERFORMING PACKET FLOW OPTIMIZATION WITH POLICY AND CHARGING CONTROL

CLAIM OF PRIORITY UNDER 35 U.S.C. §119

The present Application for patent claims priority to two Provisional Applications No. 61/121,158 filed Dec. 9, 2008 and No. 61/121,344 filed Dec. 10, 2008, both entitled "Apparatus and Method for Performing Packet Flow Optimization with Policy and Charging Control (PCC) in a Wireless Communication System", and both assigned to the assignee hereof and hereby expressly incorporated by reference herein.

BACKGROUND

1. Field

The present disclosure relates generally to communication, and more specifically to Policy and Charging Control (PCC)/Quality of Service (QoS) for encapsulated data flows in a wireless communication network.

2. Background

The 3rd Generation Partnership Project (3GPP) Long Term Evolution (LTE) represents a major advance in cellular technology and is the next step forward in cellular 3G services as the natural evolution of a Global System for Mobile communications (GSM) and a Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

Access points can provide wireless network access to the mobile devices by communicating with various components of the underlying wireless network, such as mobility management entities (MME), gateways, policy servers, etc. The mobile devices, in one example, can communicate with a network gateway using one or more internet protocol (IP) flows, and the policy server can authorize the IP flows. In addition, one or more serving or intermediate gateways can facilitate communicating between the mobile device and network gateway. The policy server provides policies to the serving gateway allowing the serving gateway to traverse the IP flows between the mobile devices and the network gateway to provide support, such as quality of service support. The IP flows, however, can additionally be encapsulated from the mobile devices to the network gateway using host based mobility depending on a mobility protocol utilized. In this regard, the serving gateway may not know the appropriate encapsulation information to successfully traverse the flows when providing support.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for wireless communication by employing a processor executing computer executable instructions stored on a computer readable storage medium to implement the following acts: A request is transmitted from a first network entity to a second network entity to establish a policy and charging control session for a user equipment accessing the first network entity. A first plurality of policy and charging control rules is accessed that defines a criterion for detecting an encapsulated packet flow and an event trigger for reporting the detected flow. The encapsulated packet flow is detected by performing a packet flow optimization application using the first plurality of policy and charging control rules. An indication of the event trigger and a description of the encapsulated packet flow are transmitted from the first network entity to the second network entity. A second plurality of policy and charging control rules is received at the first network entity from the second network entity for the policy and charging control session based on the encapsulated packet flow.

In another aspect, a computer program product is provided for wireless communication. At least one computer readable storage medium stores computer executable instructions that, when executed by at least one processor, implement components: A first set of codes transmits a request from a first network entity to a second network entity to establish a policy and charging control session for a user equipment accessing the first network entity. A second set of codes accesses a first plurality of policy and charging control rules that defines an event trigger for detecting an encapsulated packet flow. A third set of codes detects the encapsulated packet flow by performing a packet flow optimization application using the first plurality of policy and charging control rules. A fourth set of codes transmits an indication of the event trigger and a description of the encapsulated packet flow from the first network entity to the second network entity. A fifth set of codes receives a second plurality of policy and charging control rules at the first network entity from the second network entity for the policy and charging control session based on the encapsulated packet flow.

In an additional aspect, an apparatus is provided for wireless communication. At least one computer readable storage medium stores computer executable instructions that, when executed by at least one processor, implement components: Means are provided for transmitting a request from a first network entity to a second network entity to establish a policy and charging control session for a user equipment accessing the first network entity. Means are provided for accessing a first plurality of policy and charging control rules that defines an event trigger for detecting an encapsulated packet flow. Means are provided for detecting the encapsulated packet flow by performing a packet flow optimization application using the first plurality of policy and charging control rules. Means are provided for transmitting an indication of the event trigger and a description of the encapsulated packet flow from the first network entity to the second network entity. Means are provided for receiving a second plurality of policy and charging control rules at the first network entity from the second network entity for the policy and charging control session based on the encapsulated packet flow.

In a further aspect, an apparatus is provided for wireless communication. A network interface transmits a request from a first network entity to a second network entity to establish a policy and charging control session for a user equipment accessing the first network entity. A computing platform is provided for accessing a first plurality of policy and charging control rules that defines an event trigger for detecting an encapsulated packet flow and for detecting the encapsulated packet flow by performing a packet flow optimization application using the first plurality of policy and charging control rules. The network interface further transmits an indication of the event trigger and a description of the encapsulated packet flow from the first network entity to the second network entity, and receives a second plurality of policy and charging control rules at the first network entity from the second network entity for the policy and charging control session based on the encapsulated packet flow.

In yet one aspect, a method is provided for wireless communication by employing a processor executing computer executable instructions stored on a computer readable storage medium to implement the following acts: A request is received from a first network entity at a second network entity to establish a policy and charging control session for a user equipment accessing the first network entity. A first plurality of policy and charging control rules is transmitted for detecting an encapsulated packet flow by performing deep packet inspection. An indication of a detection of the encapsulated packet flow is received by the first network entity. A second plurality of policy and charging control rules is derived that is based upon the encapsulated packet flow. The second plurality of policy and charging control rules is transmitted to the first network entity from the second network entity for the policy and charging control session.

In yet another aspect, a computer program product is provided for wireless communication. At least one computer readable storage medium stores computer executable instructions that, when executed by at least one processor, implement components: A first set of codes receives a request from a first network entity at a second network entity to establish a policy and charging control session for a user equipment accessing the first network entity. A second set of codes transmits a first plurality of policy and charging control rules for detecting an encapsulated packet flow by performing deep packet inspection. A third set of codes receives an indication of a detection of the encapsulated packet flow by the first network entity. A fourth set of codes derives a second plurality of policy and charging control rules that is based upon the encapsulated packet flow. A fifth set of codes transmits the second plurality of policy and charging control rules to the first network entity from the second network entity for the policy and charging control session.

In yet a further aspect, an apparatus is provided for wireless communication. At least one computer readable storage medium stores computer executable instructions that, when executed by at least one processor, implement components: Means are provided for receiving a request from a first network entity at a second network entity to establish a policy and charging control session for a user equipment accessing the first network entity. Means are provided for transmitting a first plurality of policy and charging control rules for detecting an encapsulated packet flow by performing deep packet inspection. Means are provided for receiving an indication of a detection of the encapsulated packet flow by the first network entity. Means are provided for deriving a second plurality of policy and charging control rules that is based upon the encapsulated packet flow. Means are provided for transmitting the second plurality of policy and charging control rules to the first network entity from the second network entity for the policy and charging control session.

In yet an additional aspect, an apparatus is provided for wireless communication. A network interface receives a request from a first network entity at a second network entity to establish a policy and charging control session for a user equipment accessing the first network entity, and transmits a first plurality of policy and charging control rules for detecting an encapsulated packet flow by performing deep packet inspection, and receives an indication of a detection of the encapsulated packet flow by the first network entity. A computing platform derives a second plurality of policy and charging control rules that is based upon the encapsulated packet flow. The network interface further transmits the second plurality of policy and charging control rules to the first network entity from the second network entity for the policy and charging control session.

In yet a further aspect, a system is provided for performing communication policy and charging control by having a processor operatively coupled to a computer readable medium having stored there on the following computer executable components: An operator interface receives an input from an operator that defines a first plurality of policy and charging control rules for detecting an encapsulated communication session. A network conveys a communication session. A Packet Flow Optimization operation component monitors the communication session in order to detect the encapsulated communication session in accordance with the first plurality of policy and charging control rules and to transmit a report. A Policy and Charging Resource Function activates the packet flow optimization operation component and derives a second plurality of policy and charging control rules and quality of service rules in response to receiving the report of the encapsulated communication session.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Enhancements to existing Policy and Charging Control (PCC) protocols and procedures are provided for performing Packet Flow Optimization (PFO) operations. An operator uses pre-defined PCC rules to specify the PFO flow detection criteria (e.g., the pre-defined PCC may instruct a Gateway (GW) to detect a SKYPE session by performing deep packet inspection). A Policy and Charging Resource Function (PCRF) starts or stops the PFO flow detection by activating/deactivating the related pre-defined PCC rules. The PCRF subscribes to an event trigger which indicates whether PFO flow has been detected or not. Upon PFO flow detection, the GW reports the following information to the PCRF: (a) The event trigger indication for PFO detection; (b) An identifier to identify what PFO application has been defined, which can be achieved by including the corresponding pre-defined rule identifier; and (c) The flow description (IP 5-tuples or other flow information) related to the detected PFO flow. The PCRF then derives PCC/QoS (Quality of Service) rules based on the received PFO detection information from the GW and installs them on the GW for enforcement.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
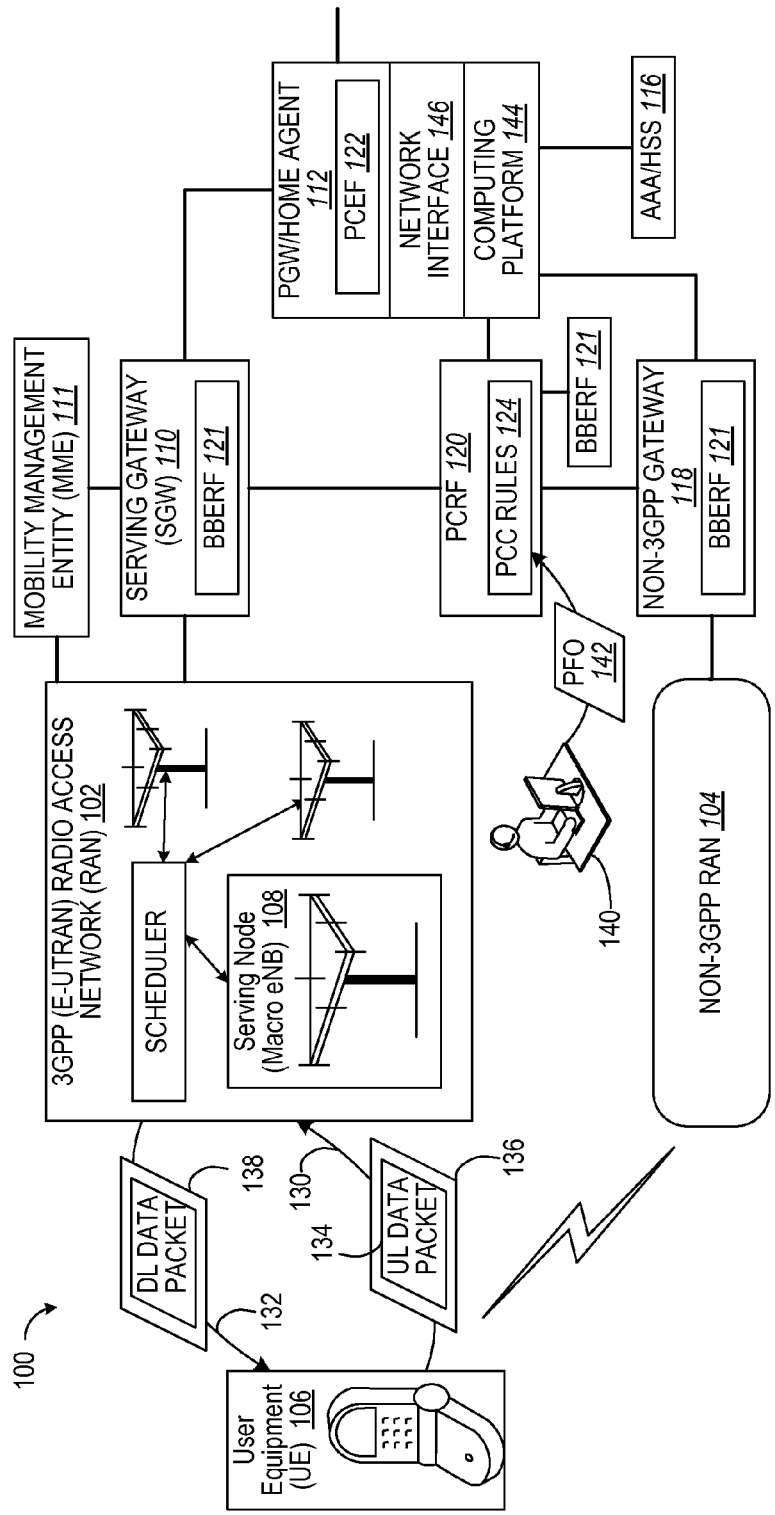
FIG. 1 illustrates a block diagram for a communication system that can implement packet flow optimization for an encapsulated communication session using policy and charging control rules.

In FIG. 1, a wireless communication system 100 provides high speed packet access from a Radio Access Network (RAN) 102, which in an illustrative aspect is an Evolved Universal Terrestrial Radio Access Network (E-UTRAN). The wireless communication system 100 can also include deployment of a non-3GPP RAN 104 that can benefit from aspects of the innovation described herein. In one aspect, User Equipment (UE) 106 can utilize either or both of the E-UTRAN RAN 102 and non-3GPP RAN 104 in order to receive one or more data services such as Internet connectivity, short message service (SMS), instant messaging (IM), wireless application protocol (WAP) access, multimedia streaming, multimedia messaging, etc. UE 106 may also be referred to as a mobile station, a terminal, an access terminal, a subscriber unit, a station, etc. UE 106 may be a cellular phone, a personal digital assistant (PDA), a wireless modem, a wireless communication device, a handheld device, a laptop computer, a cordless phone, a wireless local loop (WLL) station, etc.

E-UTRAN RAN 102 may include evolved Base Nodes (eNBs) 108 that support radio communication for UEs 106. An eNB 108 may be a fixed station that communicates with the UEs 108 and may also be referred to as a Node B, a base station, an access point, etc. A serving gateway (SGW) 110 and a Mobility Management Entity (MME) 111 may terminate the interface towards E-UTRAN RAN 102 and may perform various functions such as support for handover of UEs between eNBs, buffering, routing and forwarding of data for UEs, initiation of a network-triggered service request procedure, accounting functions for charging, etc. A Packet Data Network (PDN) GW (PGW)/home agent (HA) 112 may communicate with serving gateway 110 and may support one or more mobility protocols such as MIP, Proxy MIP (PMIP), Dual Stack Mobile IPv6 (DSMIPv6), Mobile IPv4 collocated care-of-address (MIPv4-CCoA), General Packet Radio Services (GPRS) Tunneling Protocol (GTP), etc. PGW/HA 112 may maintain current location information for roaming UEs and may route packets for these UEs. PGW/HA 112 may be a gateway dedicated as a home agent or a gateway that can provide home agent functionality as well as other functionalities.

The PGW/HA 112 may perform functions such as packet filtering and IP address allocation for UEs, service level gating control and rate enforcement, dynamic host configuration protocol (DHCP) functions for client and server, etc. An Authentication, Authorization and Accounting/Home Subscriber Server (AAA/HSS) 116 may store subscription-related information (e.g., user profiles) and location information for UEs 106. AAA/HSS 116 may perform authentication and authorization of UEs 106 and may provide information for UEs to requesting network entities.

Non-3GPP RAN 104 may be a CDMA2000 1X network, a WiMAX network, a Wi-Fi network, or some other type of RAN. Non-3GPP RAN 104 may interface with a non-3GPP gateway 118, which may perform functions similar to those performed by serving gateway 110.

A Policy and Charging Resource Function (PCRF) 120, a Bearer Binding and Event Reporting Function (BBERF) 121 and a Policy and Charging Enforcement Function (PCEF) 122 may collectively support Policy and charging control (PCC) functions. An instance of the BBERF 121 may be collocated with each of Gateways 110 and 118. An instance of the PCEF 122 may be collocated with PGW/HA 112, as shown in FIG. 1. PCRF 120 may act as a controller for PCC, receive service information from Application Functions (AFs), and provide PCC rules 124 to the PCEFs 122, and provide QoS rules to the BBERFs 121. The PCEFs 122 may enforce the PCC rules 124 provided by PCRF 120 and the BBERFs 121 may enforce the QoS rules. For example, a PCEF 122 may set up QoS for an IP flow and may provide charging function for the IP flow based on the PCC rules 124. An IP flow may also be referred to as a data flow, etc.

The RANs 102, 104 and network entities in FIG. 1 may belong in one or more public land mobile networks (PLMNs). For example, a home PLMN (HPLMN) may include PGW/HA 112 and AAA/HSS 116, and a visited PLMN (VPLMN) may include E-UTRAN RAN 102 and serving gateway 110. Non-3GPP RAN 104 and non-3GPP gateway 118 may belong in the HPLMN or VPLMN. PCRF 120 may include a home PCRF (H-PCRF) in the HPLMN and a visited PCRF (V-PCRF) in the VPLMN. Each PLMN may also include other network entities not shown in FIG. 1.

FIG. 1 shows some network entities that can support IP Connectivity Access Network (IP-CAN). IP-CAN is a collection of network entities and interfaces that provides IP transport connectivity between the UEs and core network entities. The network entities in FIG. 1 may communicate directly or indirectly with one another, e.g., via one or more data networks.

UE 106 may obtain Internet connectivity via direct IP access and/or mobile IP access. Direct IP access refers to exchange of IP packets between UE 106 and a remote entity with no support for mobility of the UE 106. Mobile IP access refers to exchange of IP packets between UE 106 and a remote entity via a network entity that may keep track of the whereabouts of the UE 106 and forward the IP packets to the UE 106 using tunneling. Mobile IP access may be supported using MIP, PMIP, DSMIPv6, MIPv4-CCoA, GTP, or some other mobility protocol. For example, UE 106 may obtain direct IP access via serving gateway 110 or non-3GPP gateway 118 and may exchange IP packets via gateway 110 or 118 without tunneling. UE 106 may also obtain mobile IP access via home agent 112 using a mobility protocol such as MIP. For mobile IP access, IP packets may be tunneled between UE 106 and home agent 112 via gateway 110 or 118.

In an exemplary aspect, the UE 106 can engage in an encapsulated packet data session via an uplink 130 and downlink 132 over-the-air with the serving RAN 102. An IP packet 134 is sent on the uplink 130 from UE 106 to home agent 112. UE 106 may communicate with another UE (not shown) and thus the IP packet 134 that is sent to the other UE can include an IP header and a payload. The IP header includes various fields including a source address field, a destination address field, and a protocol field. The source address field is set to the IP address of UE 106 (UE1 IP address), the destination address field is set to the IP address of the other UE (UE2 IP address), and the protocol field may be set to a transport layer protocol (e.g., TCP, UDP, etc.) used for the data sent in the payload. The payload of IP packet 134 may carry a transport layer datagram, which may include a header and a payload. The transport layer header may include (i) a source port field that may be set to a port at UE 106 (port Y) and (ii) a destination port that may be set to a port at the other UE (port Z). The source address, destination address, and protocol fields of the header of IP packet 134 and the source port and destination port fields of the header of the transport layer datagram may be considered as fields of an inner header.

Further, the IP packet 134 can be an untunneled packet and may be encapsulated in a tunneled IP packet 136 by UE 106 for the uplink. For tunneled IP packet 136, the source address field may be set to the IP address of UE 106 (UE1 IP address), and the destination address field may be set to the IP address of home agent 112 (HA IP address). The source address, destination address, and protocol fields of the header of IP packet 134 may be considered as fields of an outer header. A tunneled IP packet 138 for the downlink 132 may be generated in similar manner, albeit with the following differences. In the outer header, the source address may be set to the IP address of home agent 112, and the destination address may be set to the IP address of UE 106.

For the uplink 130, UE 106 may perform tunneling for IP packets, and home agent 112 may perform de-tunneling. UE 106 may send tunneled IP packets toward gateway 110 or 118, which may forward the tunneled IP packets to home agent 112. For the downlink 132, home agent 112 may perform tunneling for IP packets, and UE 106 may perform de-tunneling. Home agent 112 may send tunneled IP packets toward gateway 110 or 118, which may forward the tunneled IP packets to UE 106. For simplicity, IP packets are also referred to as simply packets in the description below.

PCRF 120 may send PCC rules 124 for PCC sessions to the PCEFs 122. A PCC session may be established between PCRF 120 and serving gateway 110, non-3GPP gateway 118, or home agent 112 and may cover one or more IP flows.

In an illustrative aspect, each IP flow may be identified by a set of parameters, which may include the source address, the destination address, the transport layer protocol, the source port, and the destination port. The PCC rules for each PCC session may include information on the IP flows in the PCC session, QoS rules or policy to apply on the IP flows, charging information for the IP flows, and/or other information related to the PCC session. The QoS rules may indicate the bandwidth, delay and priority for the IP flows, whether to block or pass packets in the IP flows, etc. The charging information may indicate the charging mechanism(s) for the IP flows, e.g., flat rate, time based, or packet count based charging.

In the present innovation, an operator 140 is capable of implementing Packet Flow Optimization (PFO) 142 into the PCC rules 124, for either encapsulated or normal IP data flows. The PGW/HA 112 can execute the PCC rules 124 as part of executing the PCEF 122 in a computing platform 144 that communicates via a network interface 146.

Figure 2:
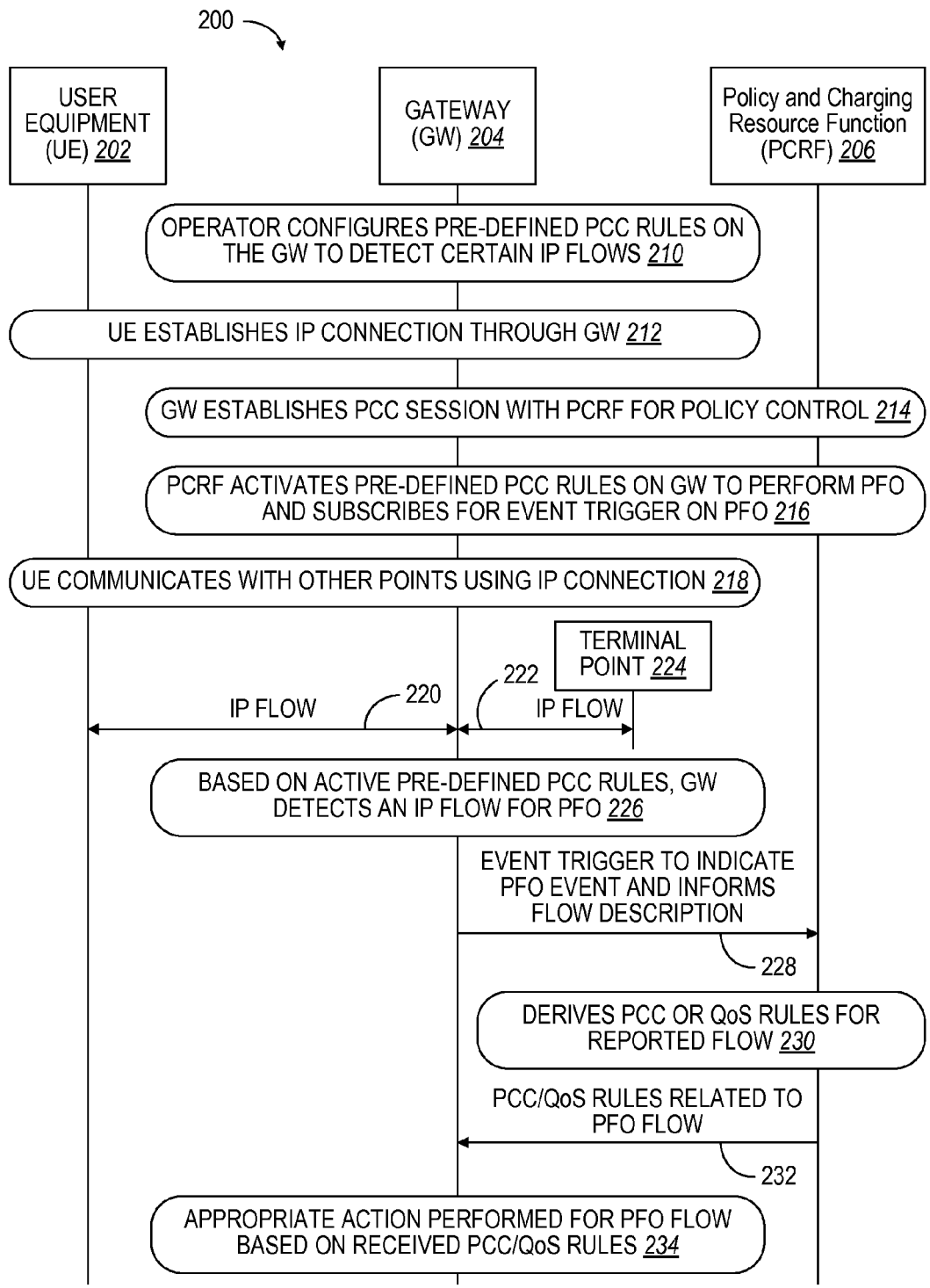
FIG. 2 illustrates a timing diagram of a methodology for packet flow optimization for an encapsulated communication session using policy and charging control rules.

In FIG. 2, a methodology 200 for PCC is provided as a framework within a Third or Fourth Generation (3G/4G) network depicted as UE 202, Gateway (GW) 204, and PCRF 206 that allows operators to authorize and enforce policy, Quality of Service (QoS), and charging control over communication sessions by mobile devices. PCC is one important element within System Architecture Evolution (SAE) architecture to allow the network to perform policy and charging control. A mechanism is provided so that PCC can allow packet flow optimization. Thereby, the network can detect Internet Protocol (IP) flows based on operator defined criteria and can perform policy and QoS control.

An operator configures pre-defined PCC rules on the GW 204 to detect certain IP flows (block 210). The UE 202 establishes IP connection through GW 204 (block 212). GW 204 establishes PCC session with PCRF 206 for policy control (block 214). PCRF 206 activates pre-defined PCC rules on GW 204 to perform PFO and subscribes for event trigger on PFO (block 216). UE 202 communicates with other points using IP connection (block 218). This is depicted as an IP flow 220 between the UE 202 and GW 204 and an IP flow 222 between the GW 204 and a terminal point 224. Based upon active pre-defined PCC rules, the GW 204 detects an IP flow for PFO (block 226). Event trigger from GW 204 to PCRF 206 indicates PFO event and informs flow description (block 228). PCRF 206 derives PCC or QoS rules for reported flow (block 230). PCRF 206 sends PCC/QoS rules related to PFO flow to GW 204 (block 232). GW 204 performs appropriate actions for PFO flow based on received PCC/QoS rules (block 234).

By virtue of the present disclosure, in one aspect an apparatus is provided that is operable in a wireless communication system having means for using a predefined PCC rule to specify flow criteria. Means are provided for activating and deactivating flow based on predefined PCC rules. Means are provided for detecting flow and reporting an event trigger indication for the flow detection.

In another aspect, a method used in a wireless communication system is provided. A predefined PCC rule is used to specify flow criteria. Flow is activated and deactivated based on predefined PCC rules. Flow and reporting event trigger indication for the flow detection is detected. In an additional aspect, an electronic device is configured to execute the method.

In a further aspect, a computer program product comprises a computer-readable medium comprising code for using a predefined PCC rule to specify flow criteria, for activating and deactivating flow based on predefined PCC rules, and for detecting flow and reporting event trigger indication for the flow detection.

In yet another aspect, an apparatus operable in a wireless communication system is provided. A processor is configured for using a predefined PCC rule to specify flow criteria, for activating and deactivating flow based on predefined PCC rules, and for detecting flow and reporting event trigger indication for the flow detection. A memory is coupled to the processor for storing data.

Figure 3:
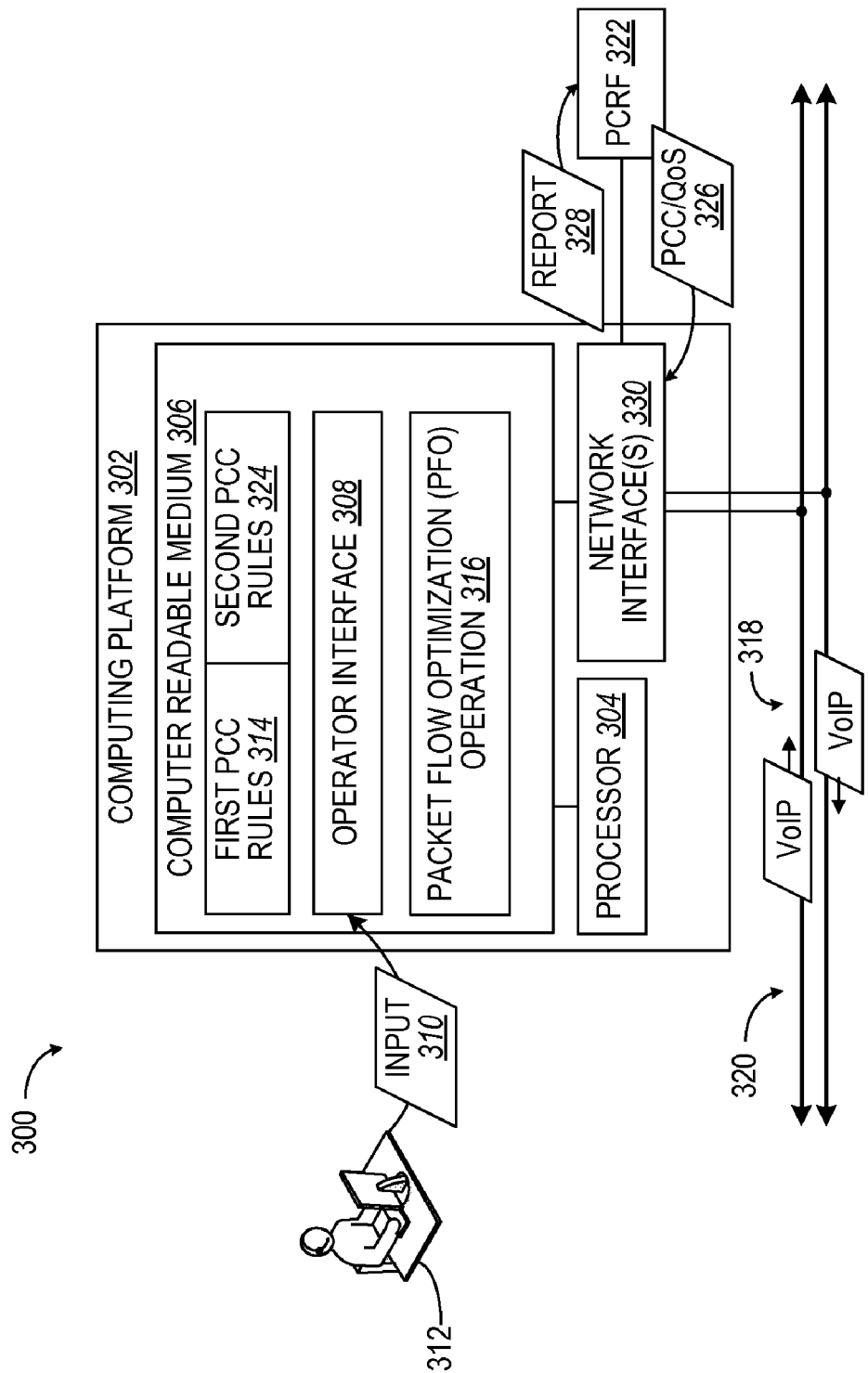
FIG. 3 illustrates a block diagram of a system for operator-defined packet flow optimization operation for implementing policy and charging control rules.

In FIG. 3, a system 300 is provided for communication policy and charging control for a communication network. A computing platform 302 of at least one processor 304 is operatively coupled to a computer readable medium 306 having stored there on the following computer executable components: An operator interface 308 receives an input 310 from an operator 312 that defines a first plurality of policy and charging control (PCC) rules 314 related to a Packet Flow Optimization (PFO) operation component 316 for detecting a communication session, depicted as a VoIP session 318, conveyed over a network 320. A Policy and Charging Rule Function (PCRF) 322 activates the PFO operation component 316 when communication is initiated by the user of the network. The PFO operation component 316 monitors the communication session in order to detect and report the communication session to the PCRF 322 in accordance with the first plurality of PCC rules 314. The PCRF 322 derives a second plurality of PCC rules 324 and quality of service rules 326 in response to receiving a report 328 of the communication session (VoIP) 318 and installs the new set of rules 324 on the computing platform 302 to control the detected communication session 318. The system can be distributed wherein portions are interconnected to communication by network interface(s) 330.

Figure 4:
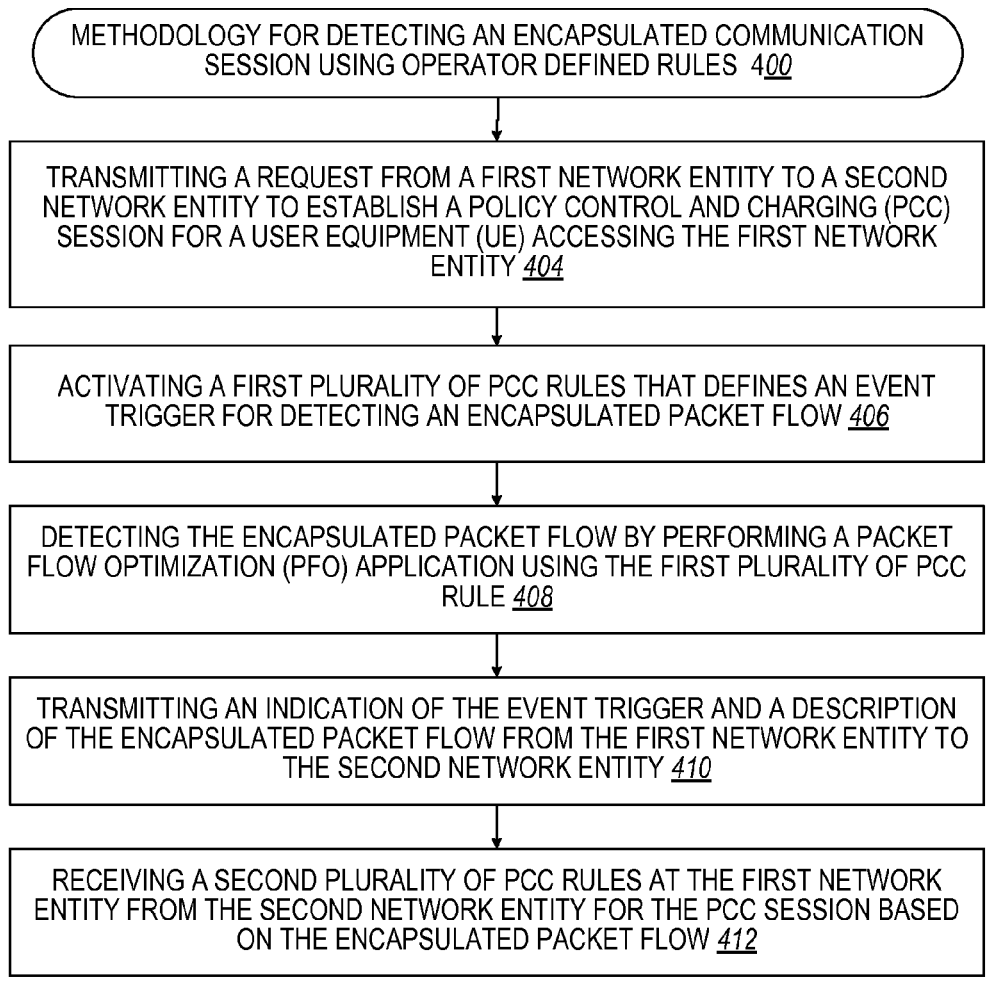
FIG. 4 illustrates a flow diagram of a methodology for detecting an encapsulated communication session using operator defined rules.

In FIG. 4, a methodology 400 is provided for operator-defined packet flow optimization for encapsulated packet communication by employing a processor executing computer executable instructions stored on a computer readable storage medium to implement following acts: A first network entity transmits a request to a second network entity to establish a policy and charging control (PCC) session for a user equipment (UE) accessing the first network entity (block 404). A first plurality of predefined PCC rules is activated that defines an event trigger for detecting an encapsulated packet flow (block 406). The encapsulated packet flow is detected by performing a Packet Flow Optimization (PFO) application using the first plurality of PCC rules (block 408). An indication of the event trigger and a description of the encapsulated packet flow are transmitted from the first network entity to the second network entity (block 410). A second plurality of PCC rules are received at the first network entity from the second network entity for the PCC session based on the encapsulated packet flow (block 412).

Figure 5:
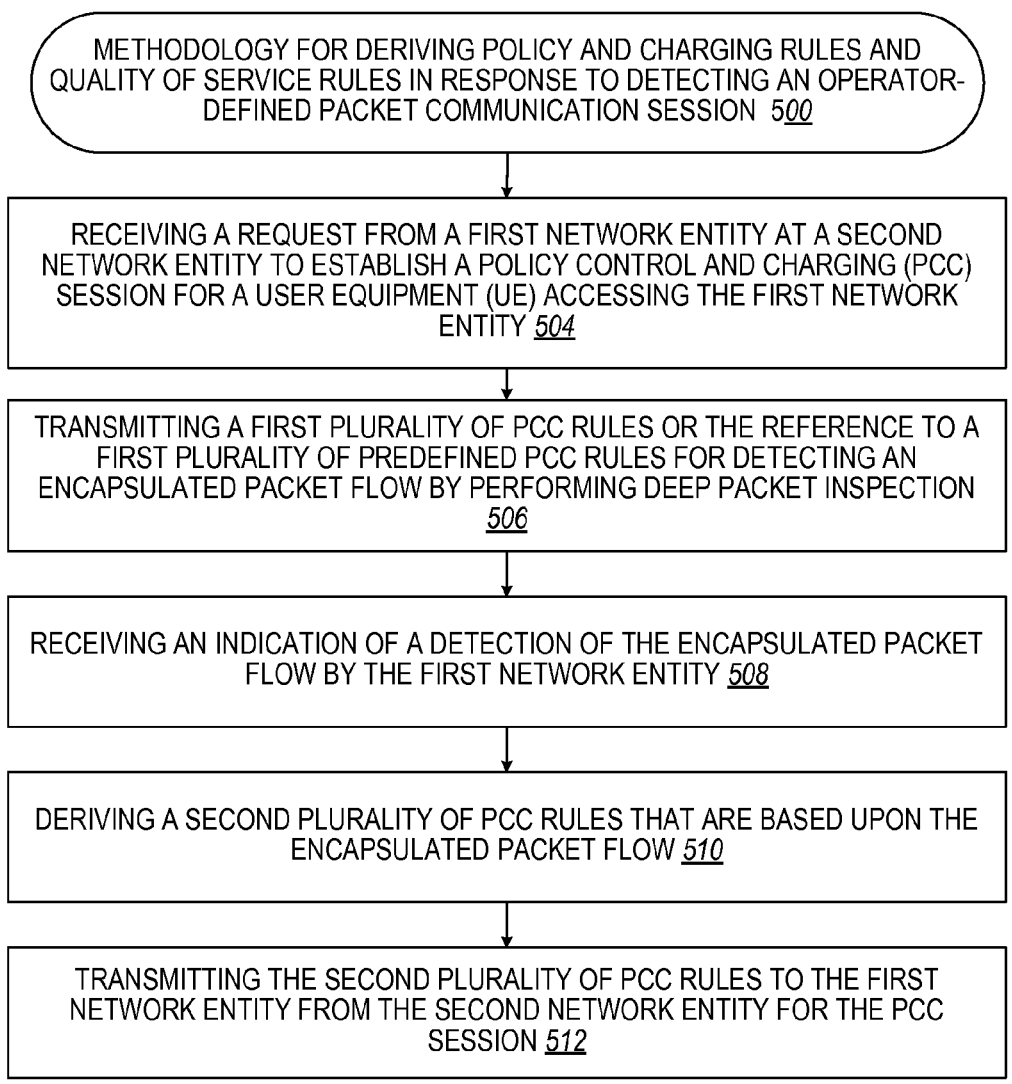
FIG. 5 illustrates a flow diagram of a methodology for deriving policy and charging rules and quality of service rules in response to detecting an operator-defined packet communication session.

In FIG. 5, a methodology 500 is provided for operator-defined packet flow optimization for encapsulated packet communication by employing a processor executing computer executable instructions stored on a computer readable storage medium to implement following acts: A request is received from a first network entity at a second network entity to establish a policy and charging control (PCC) session for a user equipment (UE) accessing the first network entity (block 504). A first plurality of PCC rules are transmitted or the reference to a first plurality of predefined PCC rules for detecting an encapsulated packet flow by performing deep packet inspection (block 506). An indication is received of a detection of the encapsulated packet flow by the first network entity (block 508). A second plurality of PCC rules is derived that are based upon the encapsulated packet flow (block 510). The second plurality of PCC rules are transmitted to the first network entity from the second network entity for the PCC session (block 512).

Figure 6:
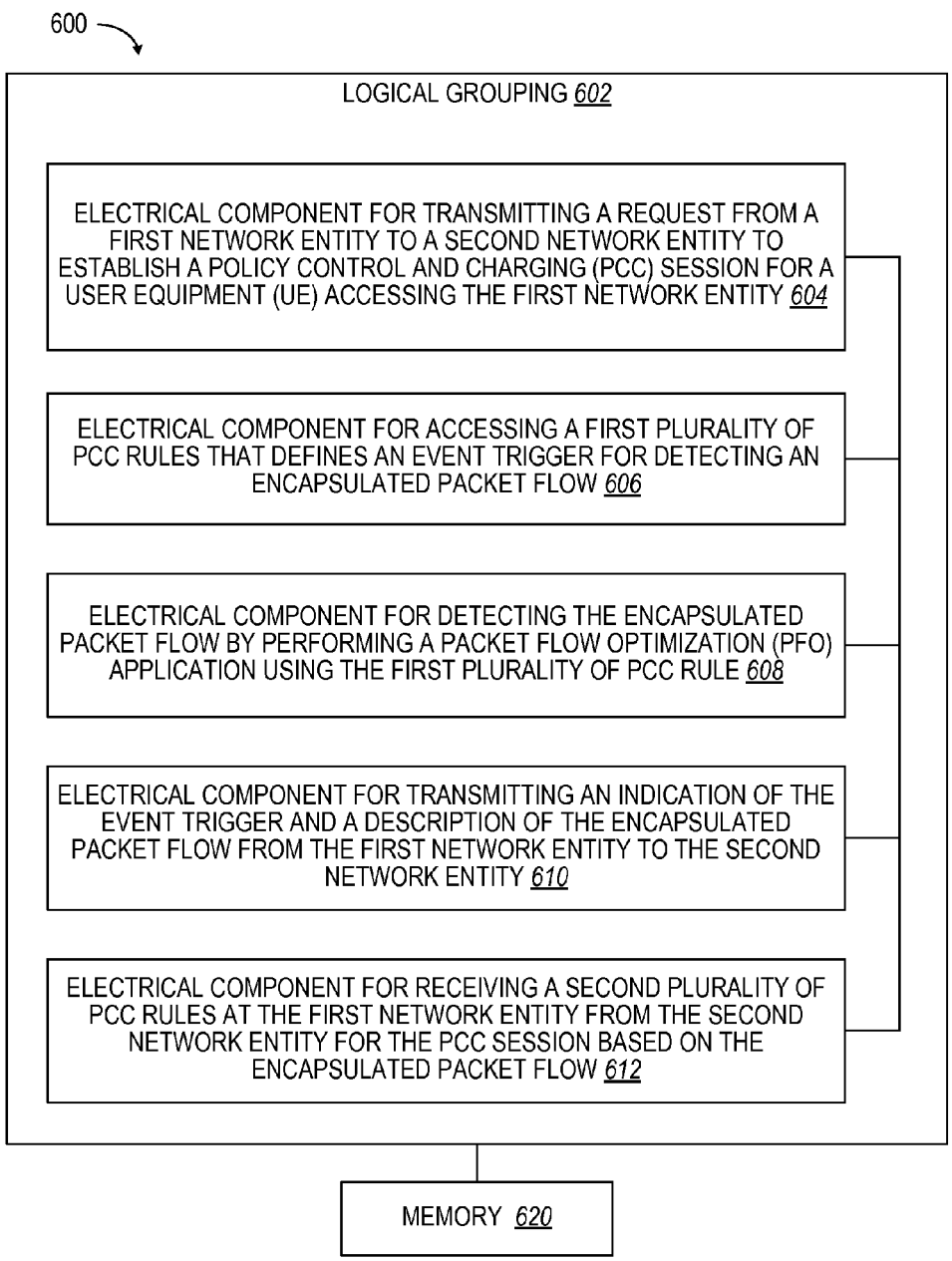
FIG. 6 illustrates a block diagram of a logical grouping of electrical components for detecting an encapsulated communication session using operator defined rules.

With reference to FIG. 6, illustrated is a system 600 for wireless communication. For example, system 600 can reside at least partially within a network entity. It is to be appreciated that system 600 is represented as including functional blocks, which can be functional blocks that represent functions implemented by a computing platform, processor, software, or combination thereof (e.g., firmware). System 600 includes a logical grouping 602 of electrical components that can act in conjunction. For instance, logical grouping 602 can include an electrical component for transmitting a request from a first network entity to a second network entity to establish a policy and charging control (PCC) session for a user equipment (UE) accessing the first network entity 604. Moreover, logical grouping 602 can include an electrical component for accessing a first plurality of PCC rules that defines an event trigger for detecting an encapsulated packet flow 606. For another instance, logical grouping 602 can include an electrical component for detecting the encapsulated packet flow by performing a Packet Flow Optimization (PFO) application using the first plurality of PCC rules 608. For an additional instance, logical grouping 602 can include an electrical component for transmitting an indication of the event trigger and a description of the encapsulated packet flow from the first network entity to the second network entity 610. For yet another instance, logical grouping 602 can include an electrical component for receiving a second plurality of PCC rules at the first network entity from the second network entity for the PCC session based on the encapsulated packet flow 612. Additionally, system 600 can include a memory 620 that retains instructions for executing functions associated with electrical components 604-612. While shown as being external to memory 620, it is to be understood that one or more of electrical components 604-612 can exist within memory 620.

Figure 7:
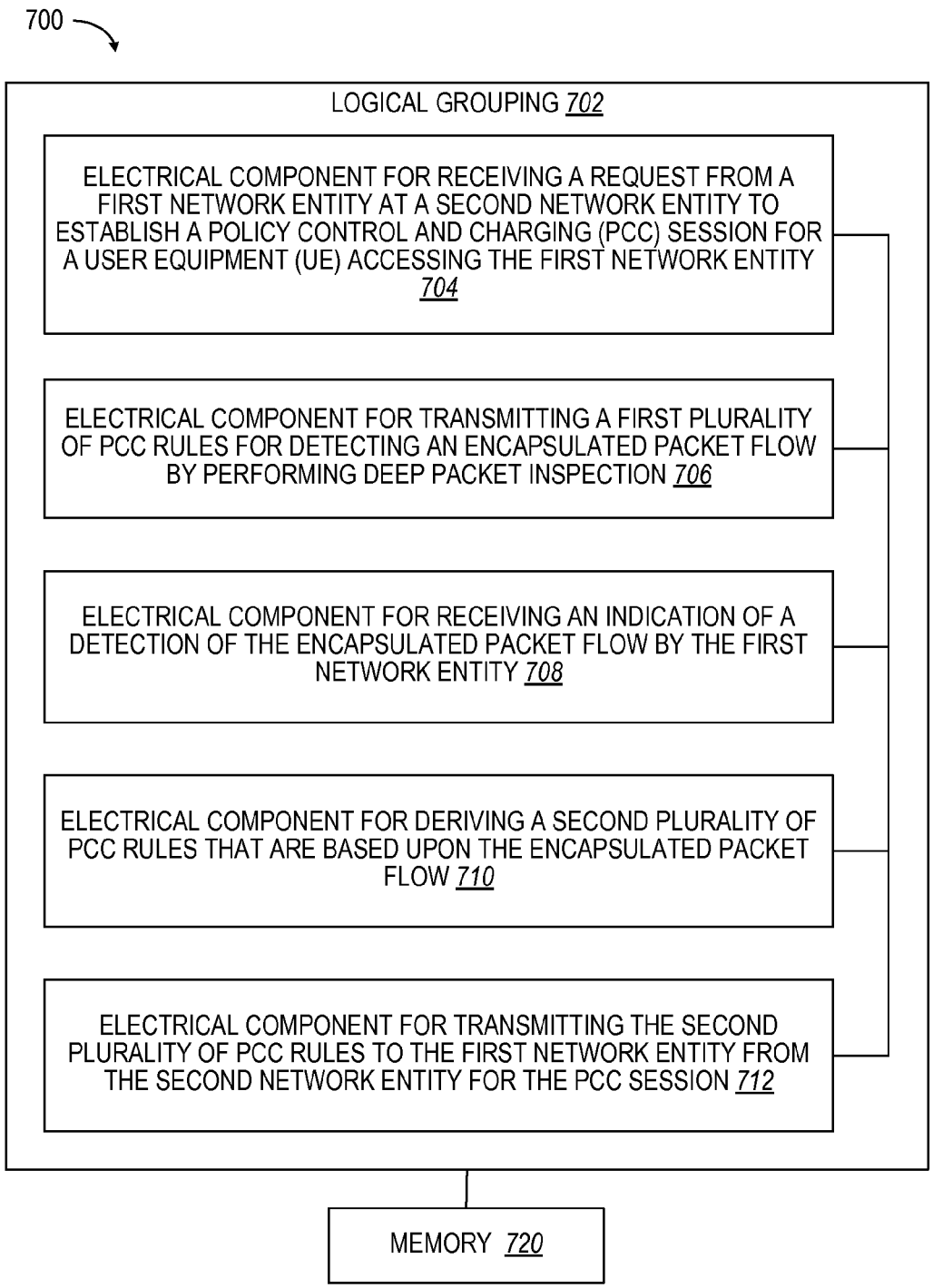
FIG. 7 illustrates a block diagram of a logical grouping of electrical components for deriving policy and charging rules and quality of service rules in response to detecting an operator-defined packet communication session.

With reference to FIG. 7, illustrated is a system 700 for wireless communication. For example, system 700 can reside at least partially within a network entity. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component for receiving a request from a first network entity at a second network entity to establish a policy and charging control (PCC) session for a user equipment (UE) accessing the first network entity 704. Moreover, logical grouping 702 can include an electrical component for transmitting a first plurality of PCC rules for detecting an encapsulated packet flow by performing deep packet inspection 706. For another instance, logical grouping 702 can include an electrical component for receiving an indication of a detection of the encapsulated packet flow by the first network entity 708. For an additional instance, logical grouping 702 can include an electrical component for deriving a second plurality of PCC rules that are based upon the encapsulated packet flow 710. For yet another instance, logical grouping 702 can include an electrical component for transmitting the second plurality of PCC rules to the first network entity from the second network entity for the PCC session 712. Additionally, system 700 can include a memory 720 that retains instructions for executing functions associated with electrical components 704-712. While shown as being external to memory 720, it is to be understood that one or more of electrical components 704-712 can exist within memory 720.

Figure 8:
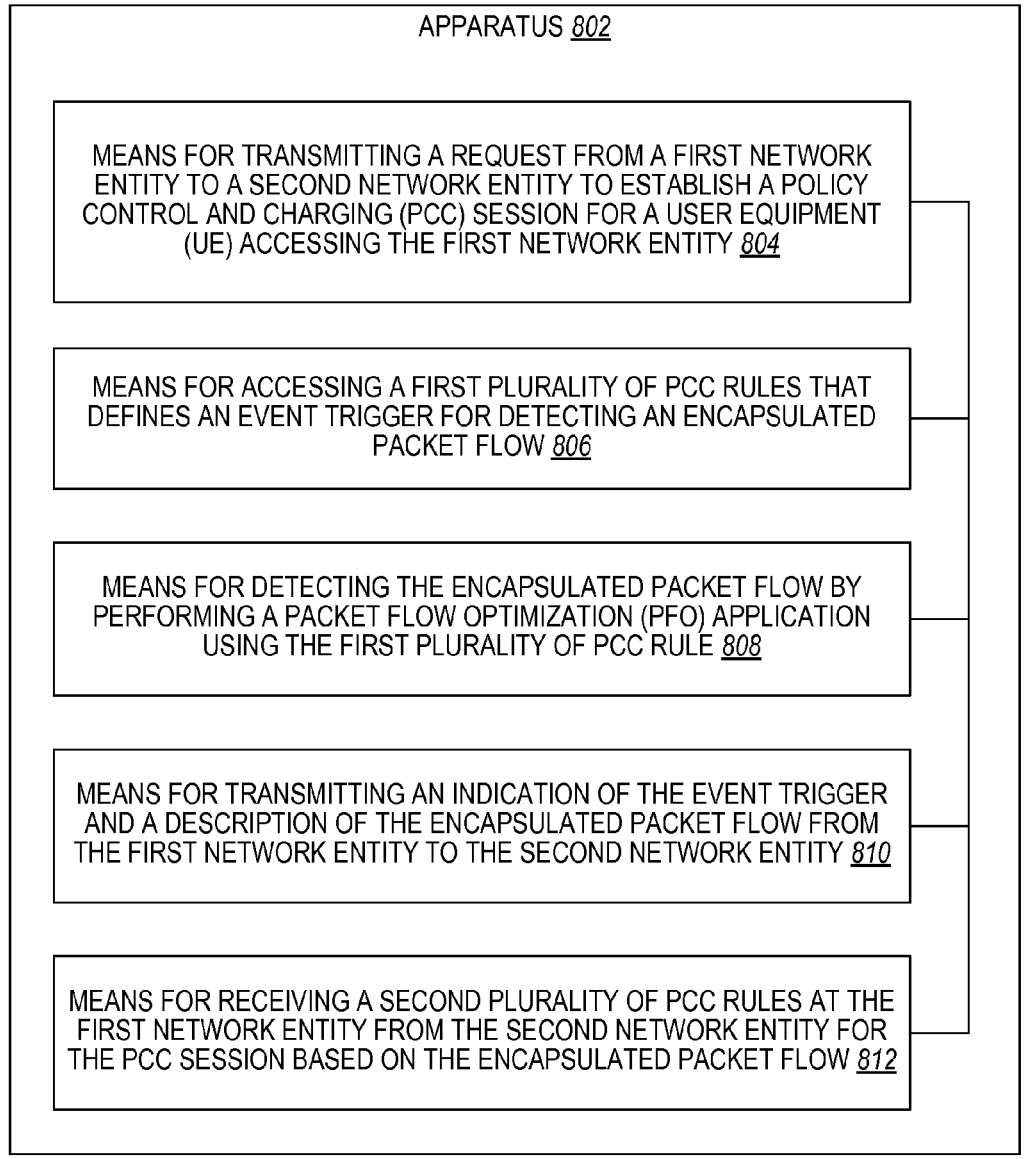
FIG. 8 illustrates a block diagram of an apparatus having means for detecting an encapsulated communication session using operator defined rules.

In FIG. 8, an apparatus 802 is depicted for wireless communication. Means 804 are provided for transmitting a request from a first network entity to a second network entity to establish a policy and charging control (PCC) session for a user equipment (UE) accessing the first network entity. Means 806 are provided for accessing a first plurality of PCC rules that defines an event trigger for detecting an encapsulated packet flow. Means 808 are provided for detecting the encapsulated packet flow by performing a Packet Flow Optimization (PFO) application using the first plurality of PCC rules. Means 810 are provided for transmitting an indication of the event trigger and a description of the encapsulated packet flow from the first network entity to the second network entity. Means 812 are provided for receiving a second plurality of PCC rules at the first network entity from the second network entity for the PCC session based on the encapsulated packet flow.

Figure 9:
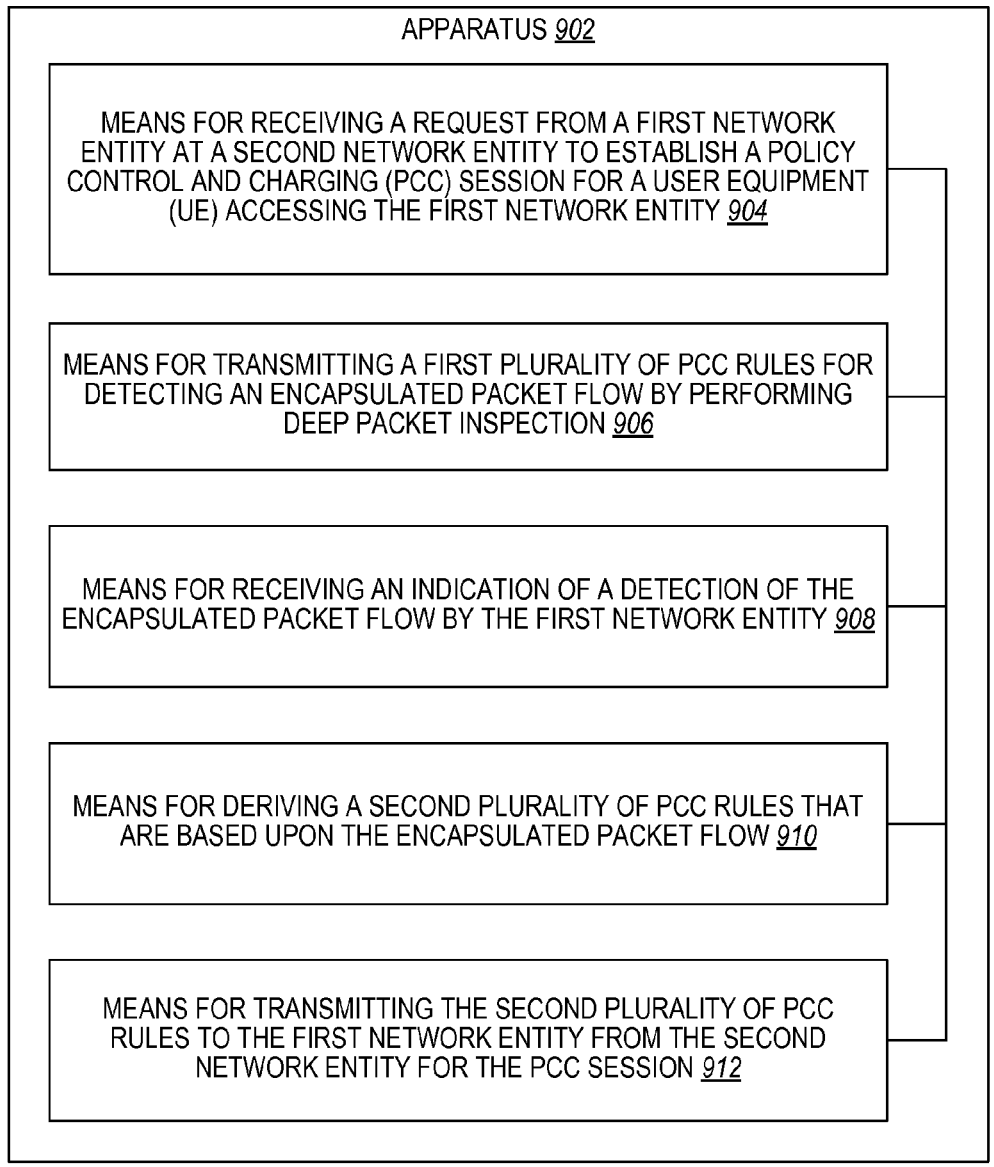
FIG. 9 illustrates a block diagram of an apparatus having means for deriving policy and charging rules and quality of service rules in response to detecting an operator-defined packet communication session.

In FIG. 9, an apparatus 902 is depicted for wireless communication. Means 904 are provided for receiving a request from a first network entity at a second network entity to establish a policy and charging control (PCC) session for a user equipment (UE) accessing the first network entity. Means 906 are provided for transmitting a first plurality of PCC rules for detecting an encapsulated packet flow by performing deep packet inspection. Means 908 are provided for receiving an indication of a detection of the encapsulated packet flow by the first network entity. Means 910 are provided for deriving a second plurality of PCC rules that are based upon the encapsulated packet flow. Means 912 are provided for transmitting the second plurality of PCC rules to the first network entity from the second network entity for the PCC session.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, the method comprising:
    transmitting, by a first network entity, a request from the first network entity to a second network entity to establish a policy and charging control session for a user equipment accessing the first network entity;
    accessing, by the first network entity, a first plurality of policy and charging control rules that defines a criterion for detecting an encapsulated packet flow and an event trigger for reporting a detected flow;
    detecting, by the first network entity, the encapsulated packet flow by performing a packet flow optimization application using the first plurality of policy and charging control rules;
    transmitting an indication of the event trigger and a description of the encapsulated packet flow from the first network entity to the second network entity; and
    receiving a second plurality of policy and charging control rules at the first network entity from the second network entity for the policy and charging control session based on the encapsulated packet flow.

2. The method of claim 1, further comprising receiving an operator input defining the first plurality of policy and charging control rules.

3. The method of claim 1, wherein the first network entity comprises a home agent serving the user equipment for a mobile Internet Protocol access and wherein the second network entity comprises a policy and charging rule control function for policy, charging and QoS control.

4. The method of claim 1, wherein the first plurality of policy and charging control rules defines a deep packet inspection for an IP communication session.

5. A computer program product for wireless communication, the computer program product comprising:
    at least one non-transitory computer readable storage medium storing computer executable instructions that, when executed by at least one processor, implement components comprising:
    a first set of codes for transmitting a request from a first network entity to a second network entity to establish a policy and charging control session for a user equipment accessing the first network entity;
    a second set of codes for accessing, by the first network entity, a first plurality of policy and charging control rules that defines a criterion for detecting an encapsulated packet flow and an event trigger for reporting a detected flow;
    a third set of codes for detecting, by the first network entity, the encapsulated packet flow by performing a packet flow optimization application using the first plurality of policy and charging control rules;
    a fourth set of codes for transmitting an indication of the event trigger and a description of the encapsulated packet flow from the first network entity to the second network entity; and
    a fifth set of codes for receiving a second plurality of policy and charging control rules at the first network entity from the second network entity for the policy and charging control session based on the encapsulated packet flow.

6. The computer program product of claim 5, further comprising a sixth set of codes for receiving an operator input defining the first plurality of policy and charging control rules.

7. The computer program product of claim 5, wherein the first network entity comprises a home agent serving the user equipment for a mobile Internet Protocol access and wherein the second network entity comprises a policy and charging rule control function for policy, charging and QoS control.

8. The computer program product of claim 5, wherein the first plurality of policy and charging control rules defines a deep packet inspection for an IP communication session.

9. An apparatus for wireless communication, the apparatus comprising:
    at least one processor;
    at least one computer readable storage medium storing computer executable instructions that, when executed by at the least one processor, implement components of
a first network entity comprising:
means for transmitting a request from the first network
entity to a second network entity to establish a policy and
charging control session for a user equipment accessing
the first network entity;
means for accessing a first plurality of policy and charging
control rules that defines a criterion for detecting an
encapsulated packet flow and an event trigger for packet
detected flow;
means for detecting the encapsulated packet flow by performing a packet flow optimization application using the
first plurality of policy and charging control rules;
means for transmitting an indication of the event trigger
and a description of the encapsulated packet flow from
the first network entity to the second network entity; and
means for receiving a second plurality of policy and charging control rules at the first network entity from the
second network entity for the policy and charging control session based on the encapsulated packet flow.

10. The apparatus of claim 9, further comprising means for receiving an operator input defining the first plurality of policy and charging control rules.

11. The apparatus of claim 9, wherein the first network entity comprises a home agent serving the user equipment for a mobile Internet Protocol access and wherein the second network entity comprises a policy and charging rule control function for policy, charging and QoS control.

12. The apparatus of claim 9, wherein the first plurality of policy and charging control rules defines a deep packet inspection for an IP communication session.

13. A first network entity for wireless communication, the first network entity comprising:
a network interface for transmitting a request from the first
network entity to a second network entity to establish a
policy and charging control session for a user equipment
accessing the first network entity;
a computing platform for accessing a first plurality of
policy and charging control rules that defines a criterion
for detecting an encapsulated packet flow and an event
trigger for reporting a detected flow and for detecting the
encapsulated packet flow by performing a packet flow
optimization application using the first plurality of
policy and charging control rules; and
the network interface further for transmitting an indication
of the event trigger and a description of the encapsulated
packet flow from the first network entity to the second
network entity, and for receiving a second plurality of
policy and charging control rules at the first network
entity from the second network entity for the policy and
charging control session based on the encapsulated
packet flow.

14. The first network entity of claim 13, wherein the network interface is further for
receiving an operator input defining the first plurality of
policy and charging control rules.

15. The first network entity of claim 13, wherein the first network entity comprises a home agent serving the user equipment for a mobile Internet Protocol access and wherein the second network entity comprises a policy and charging rule control function for policy, charging and QoS control.

16. The first network entity of claim 13, wherein the first plurality of policy and charging control rules defines a deep packet inspection for an IP communication session.

17. A method for wireless communication, the method comprising:

receiving a request from a first network entity at a second
network entity to establish a policy and charging control
session for a user equipment accessing the first network
entity;
transmitting, by the second network entity, a first plurality
of policy and charging control rules for detecting an
encapsulated packet flow by performing deep packet
inspection;
receiving, at the second network entity, an indication of a
detection of the encapsulated packet flow by the first
network entity;
deriving, by the second network entity, a second plurality
of policy and charging control rules that is based upon
the encapsulated packet flow; and
transmitting the second plurality of policy and charging
control rules to the first network entity from the second
network entity for the policy and charging control session.

18. The method of claim 17, further comprising receiving an operator input defining the first plurality of policy and charging control rules.

19. The method of claim 17, wherein the first network entity comprises a home agent serving the user equipment for a mobile Internet Protocol access and wherein the second network entity comprises a policy and charging rule control function for policy, charging and QoS control.

20. The method of claim 17, wherein the first plurality of policy and charging control rules defines a deep packet inspection for an IP communication session.

21. A computer program product for wireless communication, the computer program product comprising:
at least one non-transitory computer readable storage
medium storing computer executable instructions that,
when executed by at least one processor, implement
components comprising:
a first set of codes for receiving a request from a first
network entity at a second network entity to establish a
policy and charging control session for a user equipment
accessing the first network entity;
a second set of codes for transmitting, by the second network entity, a first plurality of policy and charging control rules for detecting an encapsulated packet flow by
performing deep packet inspection;
a third set of codes for receiving, at the second network
entity, an indication of a detection of the encapsulated
packet flow by the first network entity;
a fourth set of codes for deriving, by the second network
entity, a second plurality of policy and charging control
rules that is based upon the encapsulated packet flow;
and
a fifth set of codes for transmitting the second plurality of
policy and charging control rules to the first network
entity from the second network entity for the policy and
charging control session.

22. The computer program product of claim 21, further comprising a sixth set of codes for receiving an operator input defining the first plurality of policy and charging control rules.

23. The computer program product of claim 21, wherein the first network entity comprises a home agent serving the user equipment for a mobile Internet Protocol access and wherein the second network entity comprises a policy and charging rule control function for policy, charging and QoS control.

24. The computer program product of claim 21, wherein the first plurality of policy and charging control rules defines a deep packet inspection for an IP communication session.

25. An apparatus for wireless communication, the apparatus comprising:
- at least one processor;
- at least one computer readable storage medium storing computer executable instructions that, when executed by the at least one processor, implement components of a second network entity comprising:
- means for receiving a request from a first network entity at the second network entity to establish a policy and charging control session for a user equipment accessing the first network entity;
- means for transmitting, by the second network entity, a first plurality of policy and charging control rules for detecting an encapsulated packet flow by performing deep packet inspection;
- means for receiving, at the second network entity, an indication of a detection of the encapsulated packet flow by the first network entity;
- means for deriving, by the second network entity, a second plurality of policy and charging control rules that is based upon the encapsulated packet flow; and
- means for transmitting the second plurality of policy and charging control rules to the first network entity from the second network entity for the policy and charging control session.

26. The apparatus of claim 25, further comprising means for receiving an operator input defining the first plurality of policy and charging control rules.

27. The apparatus of claim 25, wherein the first network entity comprises a home agent serving the user equipment for a mobile Internet Protocol access and wherein the second network entity comprises a policy and charging rule control function for policy, charging and QoS control.

28. The apparatus of claim 25, wherein the first plurality of policy and charging control rules defines a deep packet inspection for an IP communication session.

29. A second network entity for wireless communication, the second network entity comprising:
- a network interface for receiving a request from a first network entity at the second network entity to establish a policy and charging control session for a user equipment accessing the first network entity, for transmitting a first plurality of policy and charging control rules for detecting an encapsulated packet flow by performing deep packet inspection, and for receiving an indication of a detection of the encapsulated packet flow by the first network entity;
- a computing platform for deriving a second plurality of policy and charging control rules that is based upon the encapsulated packet flow; and
- the network interface further for transmitting the second plurality of policy and charging control rules to the first network entity from the second network entity for the policy and charging control session.

30. The second network entity of claim 29, wherein the network interface is further for
receiving an operator input defining the first plurality of policy and charging control rules.

31. The second network entity of claim 29, wherein the first network entity comprises a
home agent serving the user equipment for a mobile Internet Protocol access and wherein the second network entity comprises a policy and charging rule control function for policy, charging and QoS control.

32. The second network entity of claim 29, wherein the first plurality of policy and
charging control rules defines a deep packet inspection for an IP communication session.

* * * * *